April 23, 1929.

W. E. WINE

FREIGHT CAR

Re. 17,285

Original Filed May 23, 1927

7 Sheets-Sheet 1

Inventor:

William E. Wine, by Parker Cook

Atty.

April 23, 1929. W. E. WINE Re. 17,285

FREIGHT CAR

Original Filed May 23, 1927 7 Sheets-Sheet 2

Inventor:
William E. Wine,
by Parker Cook
Atty.

April 23, 1929. W. E. WINE Re. 17,285
FREIGHT CAR
Original Filed May 23, 1927 7 Sheets-Sheet 3
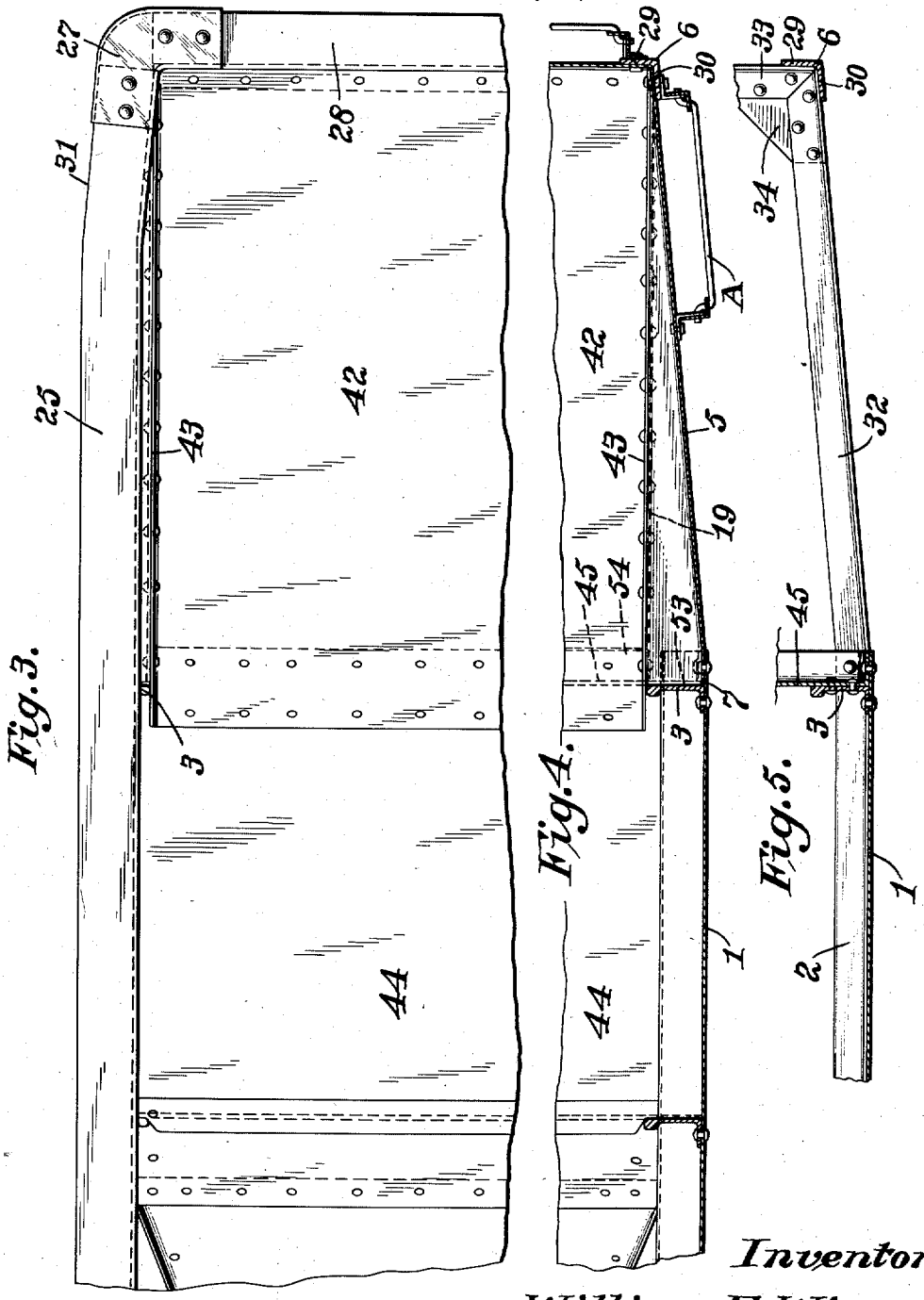
Inventor:
William E. Wine,
by Parker Cook
Atty.

April 23, 1929. W. E. WINE Re. 17,285

FREIGHT CAR

Original Filed May 23, 1927 7 Sheets-Sheet 4

Inventor:
William E. Wine,
by Parker Cook
Attys.

April 23, 1929. W. E. WINE Re. 17,285

FREIGHT CAR

Original Filed May 23, 1927 7 Sheets-Sheet 5

Inventor:
William E. Wine,
by Parker Cook
Atty.

April 23, 1929. W. E. WINE Re. 17,285

FREIGHT CAR

Original Filed May 23, 1927 7 Sheets-Sheet 6

Inventor:
William E. Wine,
by Parker Cook
Atty.

April 23, 1929. W. E. WINE Re. 17,285

FREIGHT CAR

Original Filed May 23, 1927 7 Sheets-Sheet 7

Inventor:
William E. Wine,
by Parker Cook
Atty.

Reissued Apr. 23, 1929. Re. 17,285

UNITED STATES PATENT OFFICE.

WILLIAM E. WINE, OF TOLEDO, OHIO.

FREIGHT CAR.

REISSUED

Original No. 1,698,866, dated January 15, 1929, Serial No. 193,612, filed May 23, 1927. Application for reissue filed March 19, 1929. Serial No, 348,369.

My invention relates to new and useful improvements in freight cars and more particularly to a freight car known as the full-capacity type.

The present invention is similar in its broadest aspects to the inventions shown in two co-pending applications, filed by me on March 3rd, 1926, and November 8th, 1926, and bearing Serial Numbers 91,951 and 146,977 respectively.

One of the objects of the present invention is to provide a hopper car wherein the ends are slightly reduced so that the safety appliances may be applied on the sides of the car at these reduced ends and thus come within the allowed clearance limits for the sides of the car.

Still another object of the invention is to provide a hopper car wherein the end side sheets are each preferably struck from one large piece of metal so that these end side sheets may be quickly made up in quantities on the large stamp presses with which the various shops are equipped.

Still another object of the invention is to provide the hopper car with stamped end side sheets wherein the body of the sheet extends at a slight angle to the innermost edge of the sheet, and wherein a portion of the top of the sheet slopes inwardly and at the same time narrows from its one edge to a point near the opposite edge of the sheet.

In a like manner, this sheet is also provided near its lower edge with a form of trough or bend which extends towards the outer end of the sheet and dies away to a point near the outer edge.

Still another object of the invention is to provide a freight car wherein the side stakes are formed of bulb angles to certain of which are secured the end side sheets; special forms of brackets or plates being also secured to the bulb angles and to the end side sheets to strongly and securely tie the several parts together.

Still another object of the invention is to provide the end side sheets along their respective lower edges with flanges which may be secured to the slope sheets to rigidly support the slope sheets throughout their length.

Still another object of the invention is to provide the end sheets with troughs or inclinations both at their upper and lower edges so that the coal, when being loaded into the cars, will not be hindered in its progress by any sharp angles or ridges, while in a like manner if the car is inverted to unload the coal, the same will flow freely out of the car rather than stick along the edges of the slope sheets and the end side sheets.

Still another object of the invention is to provide a freight car of the hopper type and of the type known as a "full-capacity car" which will be securely braced at the ends of the sides and wherein the slope sheets will also be rigidly supported and tied in position.

With these and numerous other objects in view, the invention consists in certain new and novel arrangements and combination of parts as will be hereinafter more fully described and pointed out in the claims.

Referring now to the drawings showing a preferred embodiment,

Fig. 3 is a fragmentary top plan at the same end of the car showing the other side thereof.

Fig. 4 is a fragmentary section taken substantially on line 4—4 of Fig. 1.

Fig. 5 is a fragmentary section taken on line 5—5 of Fig. 1.

Figure 1:
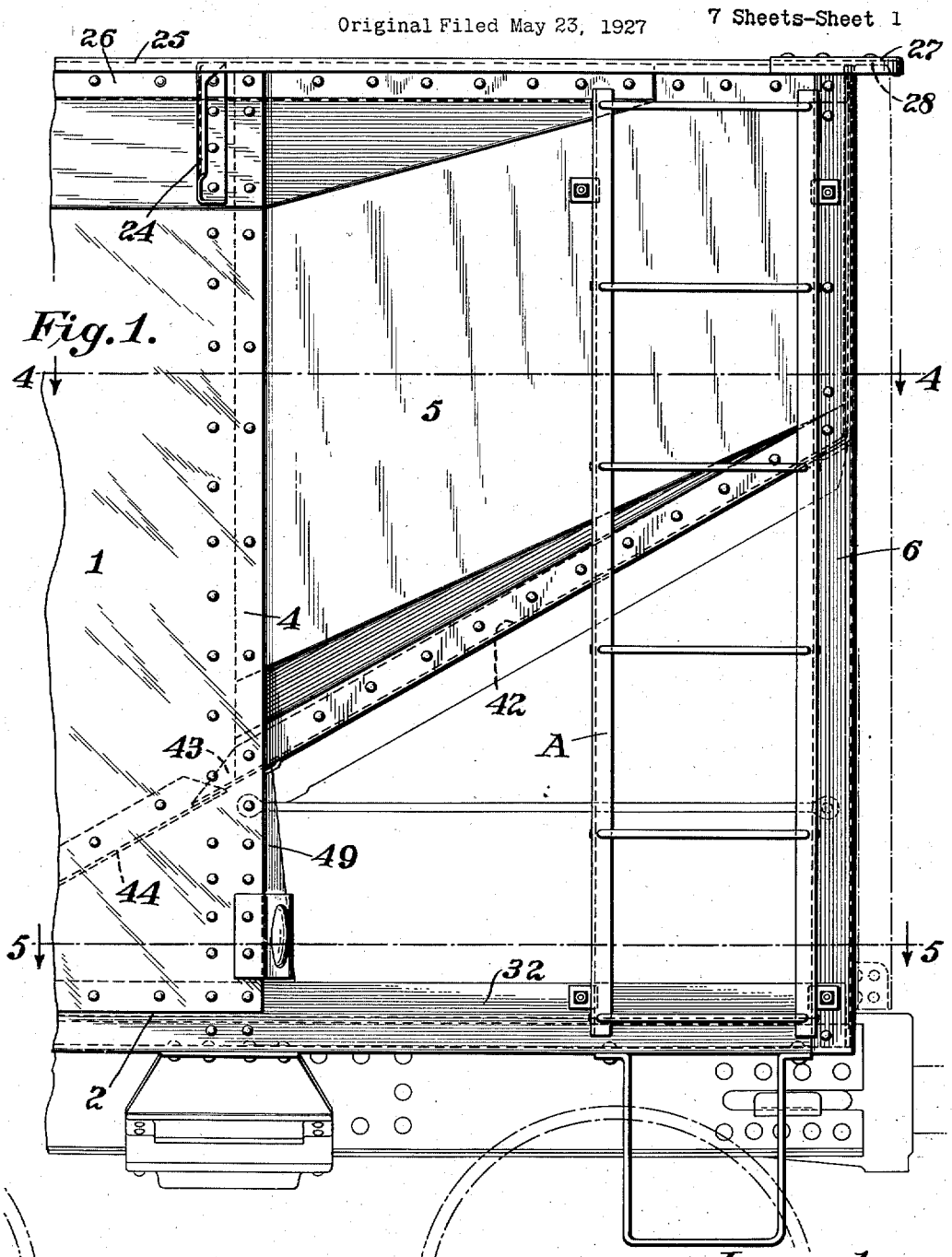
Fig. 1 is a side elevation of one end of the freight car, showing the novel end side sheets.

Referring now to the several figures, and for the moment to Fig. 1, there is shown an end of one side of the car, one of the side sheets 1 being fragmentarily shown. This sheet is securely riveted at its bottom edge to the side sill 2, and along its vertical edge to the side stake 3. Also secured beneath the edge 4 of the side sheet 1, is the end side sheet 5, while the outer edge of the end side sheet is secured to the end post 6.

As may be seen in Figs. 2, 3, 4 and 5, the end or corner posts 6 are set slightly inwardly with relation to the sides of the car so that the end side sheet 5 will also extend inwardly from its inner edge to the outer edge, which latter edge is secured to the corner post by rivets.

It might be here stated that the opposite side of the car at its ends are similarly arranged, so that a description of the end of one is a description of all.

Before going into the description of the assembly of the different parts, a full description will be set out of one of the end side sheets, it being understood that there are four of these used to the car.

Figure 14:
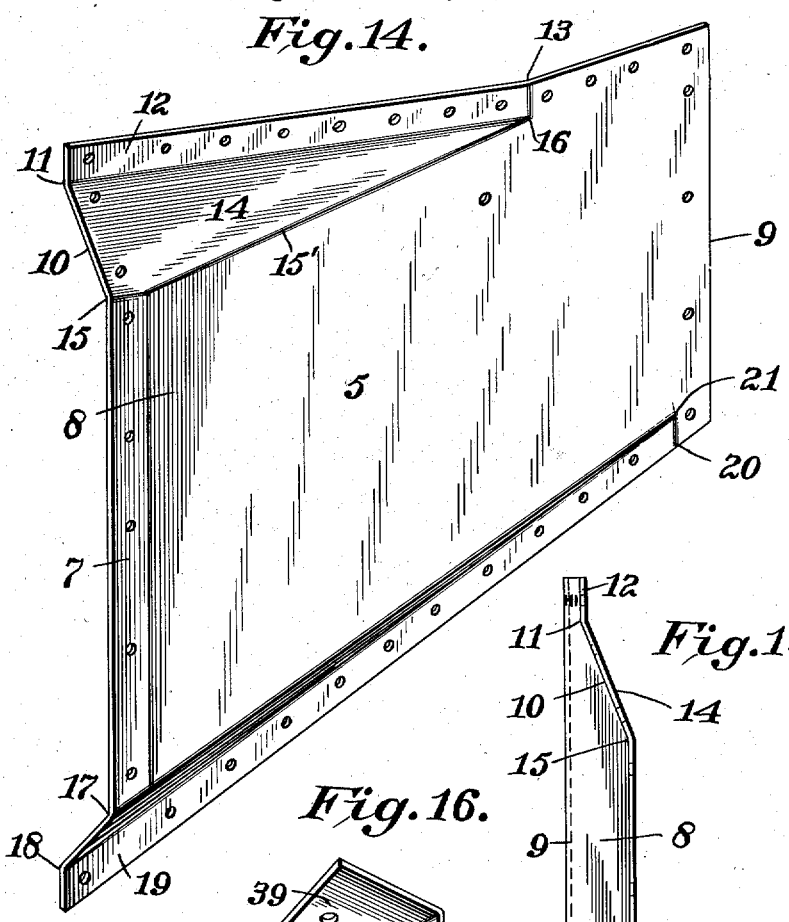
Fig. 14 is a perspective of the end side sheet.
Figure 15:
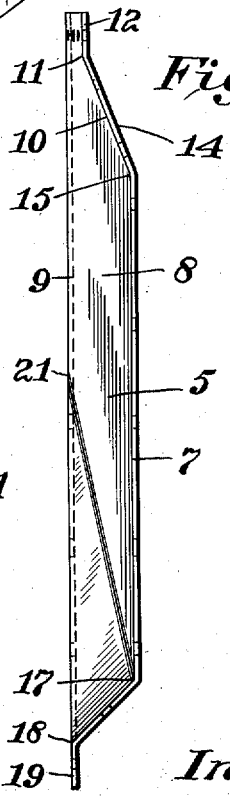
Fig. 15 is an end view of the same.

Referring now more specifically to Fig. 14, wherein the end side sheet 5 is shown in perspective, it will be noticed that there is a flange 7 extending along a part of its inner edge, while from this flange extends the body 8 of the plate. This body extends at a slight angle to the rim or flange 7, throughout its length over to the edge 9.

However, there is an inwardly flared or trough portion formed in a part of the upper edge of this end side sheet 5, the inner vertical edge of the plate extending inwardly and upwardly as at 10 to the point 11 from which point there appears the vertical flange 12 which extends longitudinally to the point 13. The wall 14 of the trough inclines from the base 15 to the bottom of the flange 12 and also narrows gradually as it approaches the vanishing point 16, which is directly beneath the point 13. In other words, we have an ever widening trough if considered as starting from the points 16 and ending at the inner vertical edge of the sheet 5.

In a like manner, there is somewhat of a similar trough formed along the bottom edge of the end sheet 5 the metal sloping inwardly from the point 17 to the point 18, as may be seen in Fig. 14, while from the point 18 to the bottom of the plate, there is shown the flange 19 which extends to the point 20 near the outer edge 9 of the plate.

This lower trough starts from the point 21 and flares or widens similar to the upper trough until it reaches its greatest width at the inner vertical edge of the plate.

Both of the troughs facilitate the ingress and egress of the coal, while the inclination or the slopping inwardly of these end side sheets provide proper space for the reception of the ladders. The several flanges, arranged along the inner vertical edge of the end side sheet, along the top and the bottom are especially arranged so that they may be secured respectively to the side stakes, top rail and slope sheets, as will be hereinafter more fully set out.

As far as the specification has proceeded, it will be seen that I have constructed an end side sheet formed from one blank of metal that may be easily and quickly stamped out on the large presses, say of a hundred ton capacity.

Furthermore, it will be seen that the arrangement of the troughs does away with any sharp corners to thus prevent any coal sticking in the corners, while at the same time they allow for a full capacity load.

Again, the inward slopping of the sheets provides room for the safety appliances as will be readily understood.

As will also be further explained, by providing the trough and flange at the bottom of the plate, no special means are necessary for supporting the slope sheets along their sides, as was the case in the co-pending application.

Figure 6:
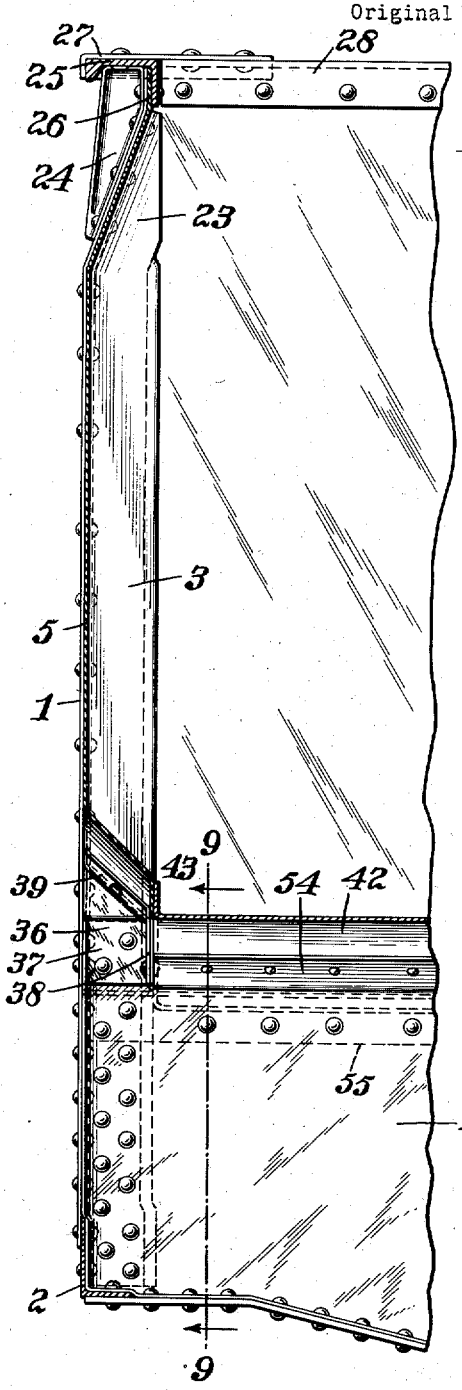
Fig. 6 is a fragmentary vertical section taken over the truck bolster, and showing the bracket which is secured to the bulb angle that forms a side stake and to the slope sheet.
Figure 9:
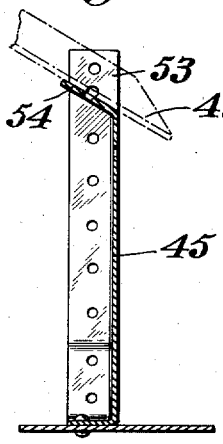
Fig. 9 is a section taken on line 9—9 of Fig. 6.

Referring now for the moment to Figs. 6 and 9 inclusive, there is shown one side stake 3 of the many that are used, these side stakes being preferably formed out of bulb angles as may be understood from Fig. 4 where two of them are shown in cross section. These angles are preferably inclined inwardly at their top, as at 23, so that the side sheet 1, as may be seen in Fig. 1, may be inclined inwardly at its top and secured to the stakes at their upper portion as well as throughout their length.

Referring again to Fig. 6, there is shown a little bracket 24 which is riveted to the side sheet and to the inclined top portion of the bulb angle, while fitting over this bracket or plate 24, is the top rail 25. One flange of this top rail is also riveted to the side sheet, that is to the upper edge 26, rivets extending also through the bracket 24.

Secured to the top side rails and end rails are the four corner plates 27. These corner plates tying the side rails 25 with the end rails 28 and the rivets designed to extend down into the respective brackets 24.

As may be seen in Fig. 4, the corner post 6 is not right angular in cross section, but is obtuse, the one leg 29 lying parallel with the end of the car, the other leg 30 lying parallel with the end side sheet. It will be remembered, however, that this sheet inclines from its outer end outwardly so that the leg 30 to lie flush with this inclining end side sheet must be at an obtuse angle with the leg 29.

In Fig. 3, the top rail is shown as extending straight throughout its length with the exception of its extreme end where it here inclines slightly inwardly as at 31 and is reinforced and tied by the corner plate 27.

Fig. 4, which will be remembered, is a section taken on line 4—4 of Fig. 1, shows the formation of the lower trough and the manner of securing the end of the end side plate 5 to the corner post 6. It also shows the ladder A secured to the end side sheet and the corner post.

In a like manner Fig. 5, which is taken on line 5—5 of Fig. 1 shows the angle 32 secured to the corner post 6 and to the lower angle 33 that extends across the end of the car; these two angles being tied with a small gusset plate 34.

Referring now for the moment again to Fig. 4, the side sheets are shown as riveted to the side stakes and it will be noticed that the edge of the side sheet 1 over-laps the vertical edge of the end sheet 5 and is riveted thereto and to the side stake, the overlapping edge of the side sheet following the contour of the adjacent flange 7 of the end sheet 5, as well as the contour of the upper trough and upper flange. This makes a rigid construction and securely ties the end side sheet to the side stake and the side sheet 1 of the car.

Figure 18:
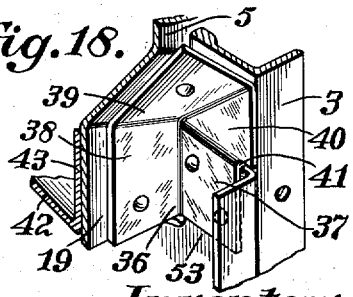
Fig. 18 is a perspective view of the corner assembly of the end side sheet, bolster plate, bulk angle stake, slope sheet and the special bracket for tying these elements together.
Figure 16:
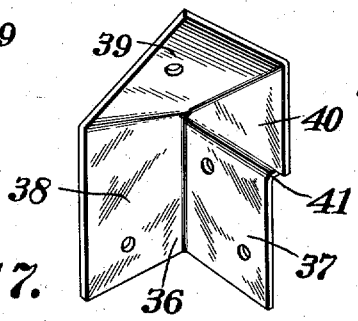
Fig. 16 is a perspective of the special bracket or tie plate.
Figure 17:
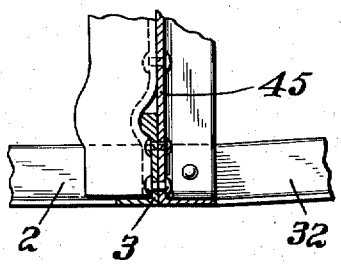
Fig. 17 is a fragmentary detail showing how one of the angles are bumped to fit over the bulb angle forming the side stakes.

Referring for the moment to Figs. 16 and 18, there is shown a special bracket 36, to be secured against the end side sheet 5 and to abut the wall of the lower trough. It is also secured to the bulb angle stake and over the upper edge 53 of the end bolster plate. The bracket also is tied to the flange 19 of the side plate 5, as may be understood from Fig. 18.

Figure 7:
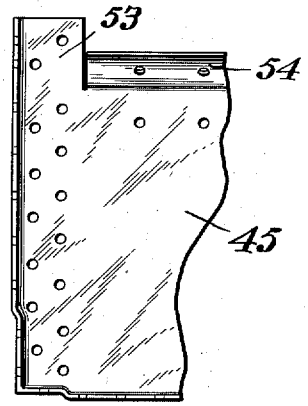
Fig. 7 is a fragmentary view of the one end of a portion of one of the bolster plates.
Figure 8:
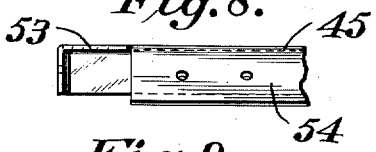
Fig. 8 is a top plan of Fig. 7.

As may be seen in the two figures above mentioned, this bracket 36 has the one leg 37 that fits over the upper edge 53 of the bolster (Fig. 7), and the other leg 38 which is adjacent the flange 19 of the end side sheet 5, and has an off-set upper plate 39 of odd shape that inclines similarly to the inclined portion of the lower trough on the plate 5. Merging with the portion 39 of the bracket is the portion 40 of triangular shape, which also merges with the leg 37, there being a small bump or off-set 41, so that the leg 37 may fit over the portion 53 of the bolster. By forming this bracket as shown, it will be seen that the end side plate, bulb angle, a portion of the bolster and the slope sheet are all securely riveted and tied together at the inner extremity of the end side plate 5 and at its lower edge.

Thus far it will be seen that I have constructed end side sheets and special forms of brackets, together with certain forms of side stakes, and have so arranged the several parts and the side sheets so that all of the parts are rigidly supported and fastened together. Rigid means are also provided for supporting the slope sheet.

Figure 2:
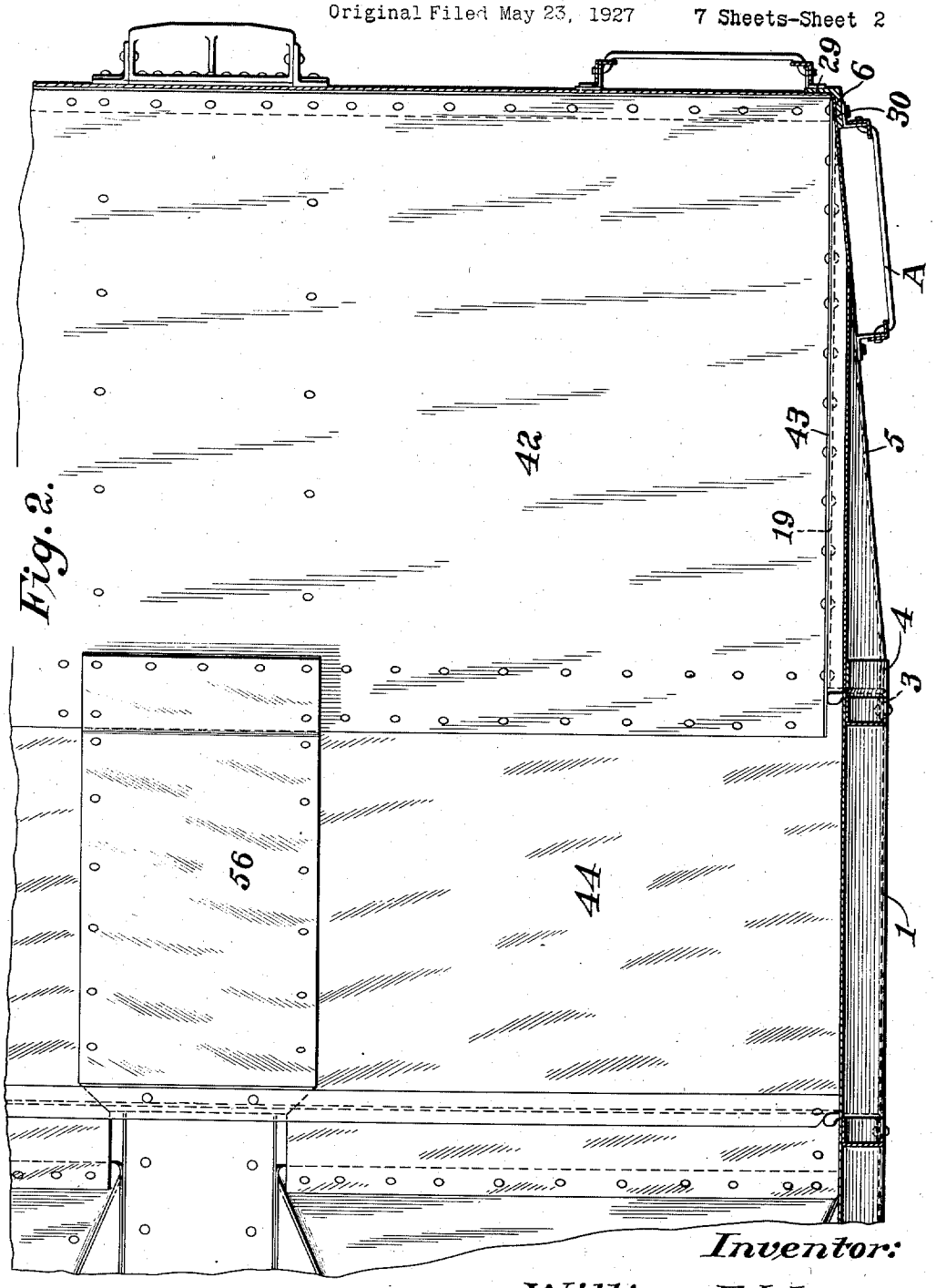
Fig. 2 is a fragmentary sectional plan view, taken at one end of the car, and showing one side thereof.

Referring for the moment to Figs. 1 and 2, it will be seen that the slope sheet 42 is provided with a flange 43 (and it is to be understood that the opposite side of the slope sheet is provided in the same manner) and this flange is secured throughout its length to the lower flange 19 of the end side sheet 5.

Figure 11:
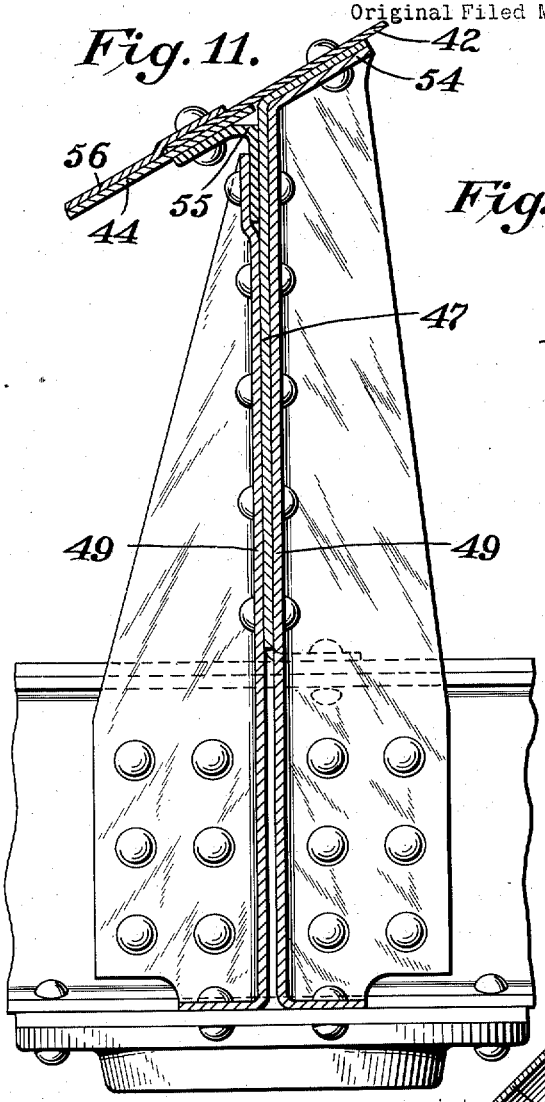
Fig. 11 is an enlarged vertical sectional view showing the reinforcing plates of the bolster taken on line 11—11 of Fig. 10.
Figure 12:
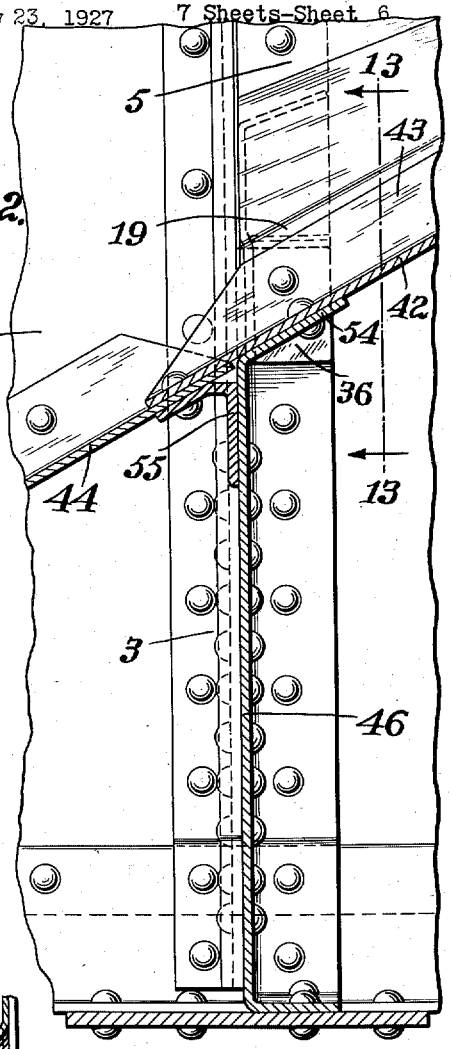
Fig. 12 is a similar sectional view of the bolster and slope sheet, but taken on the line 12—12 of Fig. 10.
Figure 13:
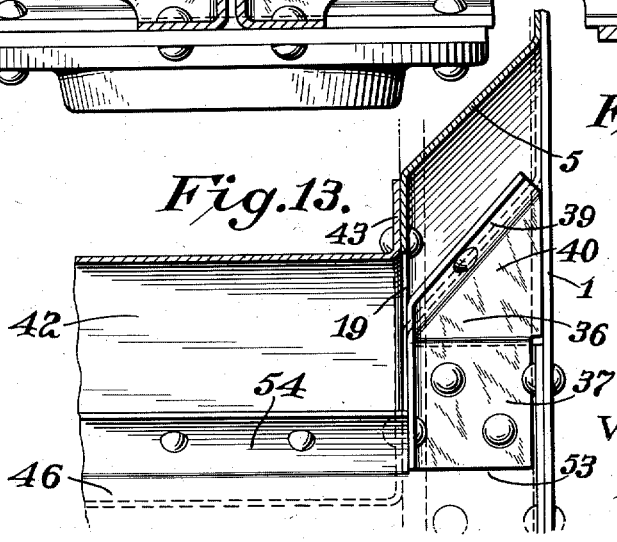
Fig. 13 is an enlarged sectional view showing the manner of securing a special bracket to the bolster, slope sheet and bulb angle taken on line 13—13 of Fig. 12.

A lower slope sheet 44 which in reality forms an extension of the sheet 42 has its one edge passing under the lower edge of the slope sheet 42, as may be seen in Fig. 2, in dotted lines in Fig. 1 and in section in Figs. 11 and 12.

Figure 10:
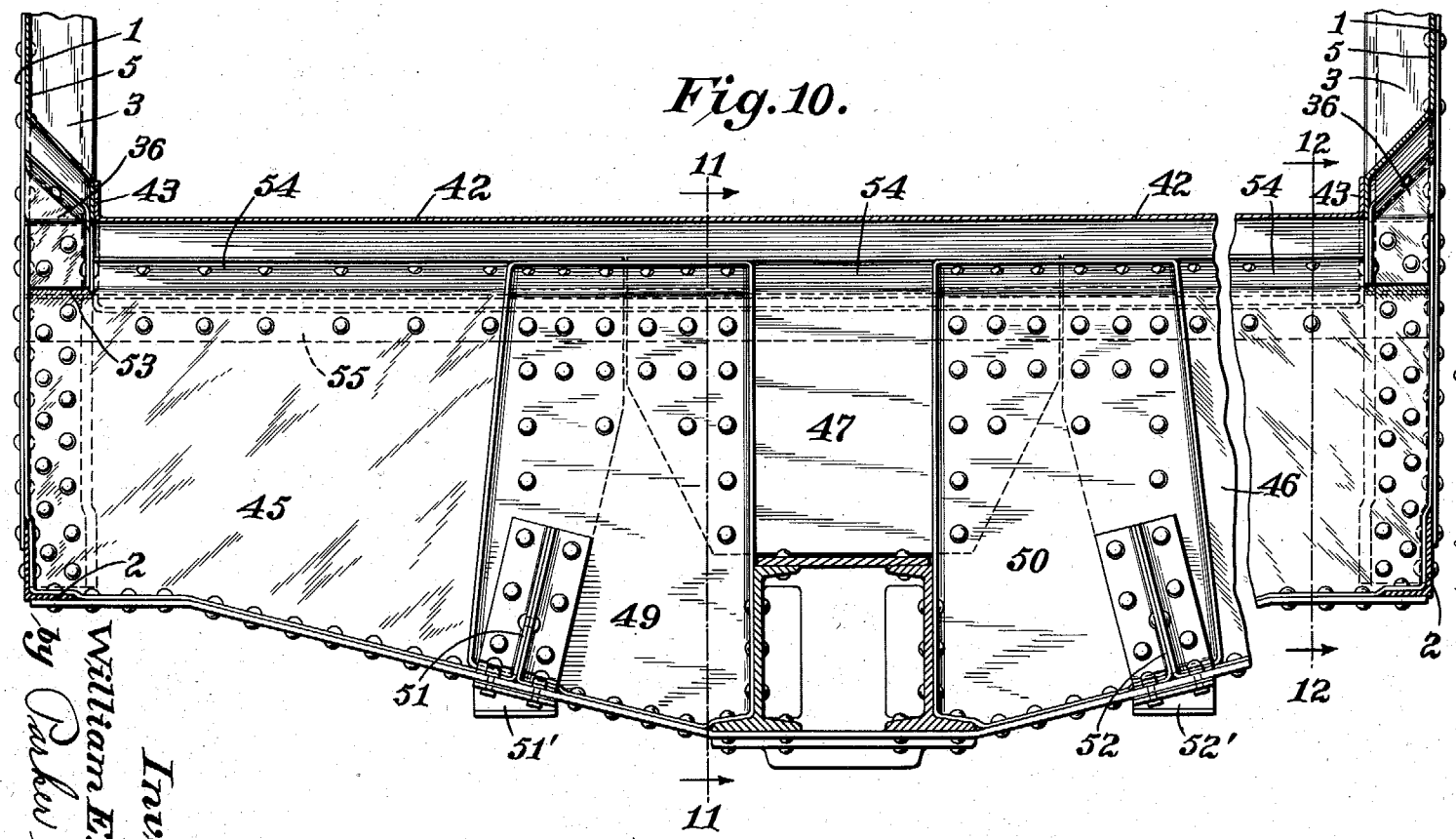
Fig. 10 is a face view of the complete bolster.

Referring now to Figs. 10, 11 and 12 and for the moment to Fig. 10, there is shown a bolster which is similar in most respects to the bolster shown in my copending application filed November 8, 1926 and bearing Serial No. 146,977.

A short description only of this will be set out, so that the other figures may be clearly understood.

The bolster comprises three main plates, that is one end plate 45, the opposite end plate 46 and a central plate 47. Tying the plates 45 and 46 to the central plate 47 are the sets of reinforcing plates 49 and 50, which in turn each consists of two plates forming a set, and positioned back to back embracing respectively the plate 45 and the plate 47 and the plates 46 and 47 between the respective abutting surfaces.

Extra reinforcing plates 51 and 52 form part of the bolster and are secured to the reinforcing plates and directly over the bearing plates 51′, 52′, which bearing plates are for the side bearings (not shown).

As before mentioned, this bolster construction is set out in a copending application, but to clearly understand Figs. 11 and 12, this description is here set forth.

In Fig. 10 also may be seen the slope sheet 42, which in turn rests and is supported by the upturned flanges 54 of the several plates of the bolster. Likewise brackets 36 are shown as well as the bulb angle stakes 3.

Now referring to Figs. 11 and 12, there is shown secured to the several plates of the bolster, the angle plate 55. In Fig. 12 may be seen the slope sheet 42 with its upturned flange 43 supported by the flange 54 extending across the top of the bolster and formed by the several plates of the bolster, while the lower edge of the slope sheet is securely riveted to the angle 55 and likewise overlaps and is riveted to the second slope sheet 44.

Centrally of the car and near the one end is the reinforcing plate 56 that in turn is secured to the top of the lower portion 44 of the slope sheet as well as to the main portion 42 of the slope sheet. This plate and the manner of riveting the same to the bolster and angle plate 55 is shown in Fig. 11.

From the foregoing it will be seen that I have provided a hopper car of the full capacity type and wherein the end side sheets are provided with an upper and lower trough and wherein certain flanges are provided which may conveniently be secured to the other parts of the car, such as slope sheets, bulb angle, side sheets and other parts.

I have also provided other means such as brackets, special forms of side stakes and special means to be used with the end side sheets and slope sheets so that a rigid construction will be had throughout.

The reduced ends in their broadest aspect are similar to the ones shown in my co-pending application, so that safety appliances may be positioned at these reduced ends, but it will be noted that in the present embodiment of the freight car, no special angles are necessary to support the slope sheets, as was called for in my co-pending application.

It will also be understood that a different form of bolster might be used than the one shown, provided it has a slightly raised end and provided it has an up-turned upper flange so that the slope sheet may be supported as shown.

Many slight changes might be made without in any way departing from the spirit and scope of the invention.

Having thus described the same, what I claim as new and desire to secure by Letters Patent is:

1. A freight car having end side sheets extending inwardly toward the end of the car, a portion of each end side plate, near its upper edge, sloping inwardly and upwardly and also a portion of its lower edge extending inwardly and downwardly.

2. An end side sheet for a freight car comprising a body portion, an ever widening trough formed therein, and a marginal flange merging with said body portion and said trough.

3. A freight car having an end side plate having a marginal flange on its inner edge, the main body of the plate extending at an angle to said flange, a trough-like portion near its upper edge and a second trough-like portion near its lower edge.

4. An end side sheet for a freight car comprising a body portion, an ever widening trough formed in the lower portion thereof, a lower marginal flange merging with the body portion and the trough.

5. In a freight car having vertical side sheets and an end side sheet extending at an angle to said vertical side sheet, said end side sheet comprising a body portion, an ever widening trough formed in the upper portion thereof and a marginal top flange merging with the body portion and the trough.

6. A freight car having plane side walls, each having a portion lying in a plane inwardly from the main portion thereof, said end portion having an ever widening trough formed in its lower portion.

7. An end side sheet comprising a body portion, an ever widening trough formed in the upper portion of the sheet, a marginal flange merging with the body portion and with the said trough, a second trough formed near the bottom of the sheet and provided with a flange merging with the trough-like portion and with the body portion near its outer edge and the length of the lower trough being greater than the length of the upper trough.

8. An end side sheet for a freight car, the said end side sheet comprising a body portion and a marginal flange at one edge, the body portion being inclined with relation to the marginal flange, a trough-like portion at the upper end of the marginal flange and dying away at a point near the opposite edge of the plate, a second trough-like portion at the lower end of the marginal flange and also dying out at a point beyond the vanishing point of the upper trough.

9. A freight car having plane side walls and sloping floors, said side walls each having an end portion lying in a plane inwardly from the main portion thereof, each of said sloping floors having an inwardly off-set portion along one of its outer edges and adapted to be secured to said side walls, said side wall end portion having a flange along its lower margin for attachment to the inwardly off-set portion of said sloping floor.

10. An end side sheet for a freight car comprising a body, an inwardly and upwardly inclined portion and a flange, the said inclined portion merging with the body and the flange and decreasing sharply in width from its base to the vanishing point, an inwardly inclined portion at the bottom of the plate, a flange merging with said inclined portion and the width of the inclined portion decreasing gradually to the vanishing point near the opposite edge of the plate.

11. A freight car having end side sheets extending inwardly towards the end of the car, a trough-like portion near the upper edge of the plate and a second trough-like portion near the lower edge of the plate.

12. A freight car having end side sheets extending towards each other and towards the end of the car to thereby provide space for the safety appliances, and upper portion of each of said end side plates sloping upwardly and inwardly towards each other, trough-like portions near the lower edge of each of said sheets sloping downwardly and inwardly towards each other.

13. A freight car having end side sheets extending slightly inwardly to the end of the car, a trough-like portion formed near the upper end of the sheet and a trough-like portion formed with the lower edge of the sheet, a slope sheet and flanges on said end side sheets for supporting said slope sheet.

14. A freight car having corner posts and side stakes spaced from said corner posts, end side sheets extending from said stakes inwardly to said corner posts, trough-like portions formed respectively near the upper and lower edges of said sheets, flanges on the lower edges of said end side sheets, slope sheets, and the said slope sheets adapted to be secured to the lower flanges on said end side sheets.

15. A freight car, four corner posts, side stakes spaced from said corner posts and the side stakes positioned slightly outwardly with relation to the corner posts, end side sheets extending inwardly from said side stakes to the corner posts, trough-like portions formed along the lower edges of said end side sheets, slope sheets and said slope sheets secured along their sides to and supported by the end side sheets.

16. A freight car having reduced ends, end side sheets inclined inwardly to the reduced ends, trough-like portions formed near the lower edge of said end side plates, lower marginal flanges merging with said trough-like portions, slope sheets and said slope sheets secured to the said marginal flanges.

17. A freight car having its end side portions restricted, bulb angle stakes defining the points of the beginning of the restriction, slope sheets extending from the restricted ends of the car towards the center of the car, end side sheets between the bulb angle and the corner of the cars, trough-like portions formed near the lower edges of the end side sheets and supporting the said slope sheets along their sides.

18. A freight car having sides, corner posts and side stakes, end side plates extending at an angle to the normal sides of the car between the side stakes and the corner posts, slope sheets and means formed on the end side sheets for supporting the slope sheets along their sides.

19. A freight car having sides and corner posts, bulb angle stakes near the corner posts and said bulb angles positioned outwardly with respect to the corner posts, end side sheets provided with trough-like portions therein near the upper and lower edges thereof, brackets fitting under the trough-like portions and secured to the bulb angle stakes, slope sheets and means along the lower edges of the end side sheets for supporting the slope sheets.

20. A freight car provided with side stakes and slightly inwardly positioned corner posts, the normal sides of the car extending between the side stakes, end side sheets extending between the end side stakes and the corner posts, a short trough extending along the lower edge of the end side sheets and inclined with relation to the bottom of the car, slope sheets extending from the ends of the car towards the center thereof, the said slope sheets secured to the end side sheets just below the lower trough of the end side sheets a bracket secured to the side stakes and contacting with a trough-like portion of the end side sheets for tying the end side sheets and slope sheets to the said side stakes.

21. A freight car comprising side stakes and corner posts, end side sheets converging inwardly from the sides to the corner posts, troughs formed in the upper and lower edges of the said side sheets, inclined flanges along the lower edge of the said end side sheets, slope sheets riveted along their edges to the said inclined flanges, brackets positioned on the side stakes for tying the slope sheets and end side sheets to their respective side stakes.

22. A freight car comprising in part a bolster, corner posts, side stakes over said bolster, end side sheets provided with trough-like portions along their lower edges and flanges merging with said trough-like portions, a slope sheet provided with a flange on its opposite edges and secured to the said flanges on said end side sheets, means on the bolster for supporting the lower edges of the slope sheet and brackets on the side stakes for tying the slope sheet and end side sheet to the bolster and side stakes.

23. A freight car having reduced ends and converging end side sheets, a rectangular slope sheet, the end side sheets having marginal flanges adapted to be secured throughout their length to the rectangular slope sheets, trough-like portions formed in the upper and lower edges of said end side sheet, a bolster, side stakes and a bracket on each of the said side stakes for tying the end side sheet, slope sheet and bolster to the respective side stakes.

24. A freight car comprising corner posts and side stakes, the latter spaced outwardly with relation to the former, end side sheets extending between the stakes and the corner posts, a bolster provided with a flange on its upper edge, a slope sheet supported near its lower edge by the said flange, flanges on the sides of said slope sheet, flanges on the lower edges of said end side sheets and the flanges on the slope sheets secured to the flanges on the end side sheets for supporting the slope sheet along its sides, a bracket riveted respectively to the side stakes and secured over a portion of said bolster and also riveted to a flange of the slope sheet and a flange of the end side sheets.

25. A freight car comprising in part a bolster having upwardly projecting ends, an upwardly extending flange on said bolster between said projecting ends, side stakes over said bolster, corner posts, end side sheets extending between said side stakes and said corner posts, a slope sheet, said slope sheet secured along the lower edges of said end side sheets, the flange on said bolster partly supporting the slope sheet, a bracket on each of said side stakes and tying the upper ends of said bolster, the slope sheet and the end side sheets to said side stake.

26. A freight car comprising in part end side sheets, a slope sheet supported by said side sheets, side stakes, a bolster, the ends of said bolster projecting upwardly and said side stakes positioned over said bolster, a bracket secured to the stakes abutting the end side sheets, riveted to said end side sheets and to the slope sheet and also to the projecting end of said bolster.

27. A freight car comprising sides and restricted ends, a slope sheet formed of two portions, the lower portion of which underlies the lower edge of the upper portion, means for supporting the over-lapping edges of the slope sheet, trough-like portions formed in the end side sheets near their lower edges and the slope sheets riveted along their sides to the end side sheets.

28. A freight car having restricted ends, end side sheets, the said end side sheets being flared outwardly as viewed from the top and the end side sheets also flared inwardly near their lower edge, brackets having two vertical legs and two flared legs, said brackets secured to said side stakes and adapted to receive a slope sheet, and one leg of the bracket abutting the lower flared portion of the end side sheets to rigidly support the same.

29. A freight car having plane side walls and sloping floors, said side walls each having an end portion lying in a plane inwardly from said main portion of the side wall, each of said sloping floors having two flanges along one of its outer edges and adapted to be secured to said side wall, one of said flanges being disposed inwardly from the other flange, said side wall end portion having a flange along its lower margin for attachment to the inwardly disposed flange of said sloping floor.

30. A freight car having side sheets and end side sheets underlying the adjacent edges of said side sheets, slop sheets, brackets for supporting the lower corners of said slope sheets and the end side sheets adapted to support the slope sheets throughout the sides of said slope sheets.

31. A freight car having obtuse angles corner posts and bulb angle side stakes, end side sheets extending between certain of the side stakes and the corner posts, the said end side sheets having trough-like portions near their upper and lower edges and a plurality of flanges about the said end side sheets, one of said flanges being secured to a corner stake, the other adapted to be secured to a top rail and the third adapted to be secured to a slope sheet.

32. A freight car having restricted ends, side sheets sloping inwardly at their upper edges and end side sheets having an inwardly sloping portion registering with a sloping portion in the side sheets, a top rail and means secured to the sloping sides of the side sheet for supporting the top rail, trough-like portions in the lower edges of the end side sheets, slope sheets and the end side sheets supporting the slope sheets throughout the length of their sides.

33. A freight car having plane side walls and sloping floors, said side walls each having an end portion lying in a plane inwardly from said main portion of the side wall, each of said sloping floors having flanges along one of its outer edges and adapted to be secured to said side wall, one of said flanges being disposed inwardly from the other flange, said end portion having a flange along its lower margin for attachment to the latter mentioned flange of said sloping floor.

In testimony whereof I affix my signature.

WILLIAM E. WINE.